(12) United States Patent
Chuang

(10) Patent No.: US 8,887,117 B1
(45) Date of Patent: Nov. 11, 2014

(54) REGISTER CLUSTERING FOR CLOCK NETWORK TOPOLOGY GENERATION

(71) Applicant: Taiwan Semiconductor Manufacturing Company Ltd., Hsinchu (TW)

(72) Inventor: Yi-Lin Chuang, Taipei (TW)

(73) Assignee: Taiwan Semiconductor Manufacturing Company Ltd., Hsinchu (TW)

( * ) Notice: Subject to any disclaimer, the term of this patent is extended or adjusted under 35 U.S.C. 154(b) by 0 days.

(21) Appl. No.: 14/047,296

(22) Filed: Oct. 7, 2013

(51) Int. Cl.
   *G06F 17/50* (2006.01)
(52) U.S. Cl.
   CPC .................................. *G06F 17/5077* (2013.01)
   USPC ............................................ 716/124; 716/125
(58) Field of Classification Search
   CPC ............ G06F 17/5077; G06F 17/5072; G06F 17/5031; G06F 17/5068; G06F 17/5045; G06F 17/5053; G06F 17/505
   USPC ........................... 716/103, 105, 113, 124, 125
   See application file for complete search history.

(56) References Cited

U.S. PATENT DOCUMENTS

2008/0168412 A1*  7/2008  Cheon et al. ..................... 716/7

\* cited by examiner

*Primary Examiner* — Vuthe Siek
(74) *Attorney, Agent, or Firm* — WPAT, P.C.; Anthony King

(57) ABSTRACT

In some embodiments, in a method performed by at least one processor, a physical netlist of a placed integrated circuit (IC) chip design is received by the at least one processor. The physical netlist comprises a plurality of registers. Timing criticalities of register pairs in the registers are obtained by the at least one processor. Clusters of the registers are formed by the at least one processor. When forming cluster of the registers, candidate registers that are in physical vicinity of a first cluster are identified, and a first register is selected to be added to the first cluster by giving priority to a candidate register in a register pair across a boundary of the first cluster and with a higher timing criticality over a candidate register located closer to the first cluster. The registers in the same cluster have shorter non-common clock paths than the registers in different clusters.

14 Claims, 10 Drawing Sheets

REGISTER CLUSTERING FOR CLOCK NETWORK TOPOLOGY GENERATION

BACKGROUND

In a design flow for an integrated circuit (IC) chip, after a gate-level netlist is partitioned into blocks, a top-level clock network is planned based on locations of the blocks.

The top-level clock network includes clock trunks rooted from a clock source such as a phase-locked loop (PLL) and tapping points to which clock sinks such as registers are to be connected to. Then, cells that implement logic gates and registers in the gate-level netlist, respectively, are placed at specific locations in the IC chip design. Then, by creating clusters of registers associated to different tapping points, a clock network topology is generated. Then, clock network synthesis during which interconnections of the registers to the tapping points are routed is performed.

BRIEF DESCRIPTION OF THE DRAWINGS

The details of one or more embodiments of the disclosure are set forth in the accompanying drawings and the description below. Other features and advantages of the disclosure will be apparent from the description, drawings and claims.

Like reference symbols in the various drawings indicate like elements.

DETAIL DESCRIPTION

Figure 1:
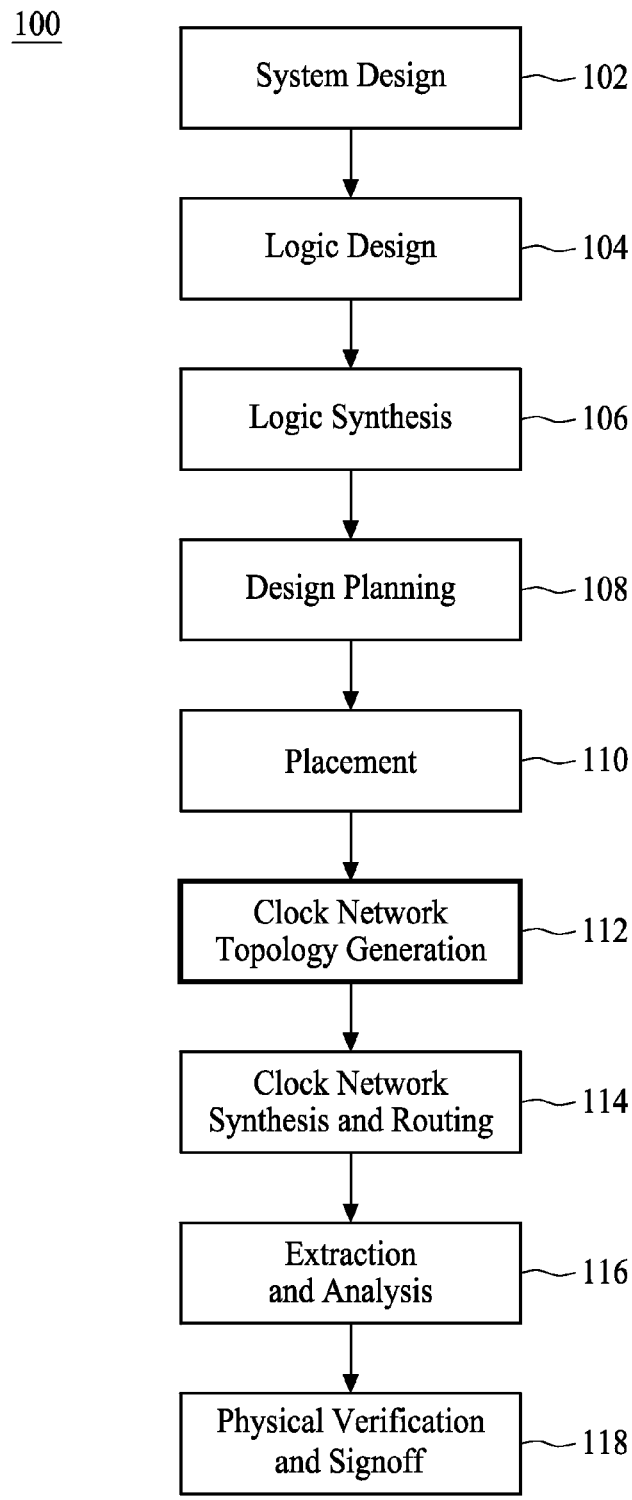
FIG. 1 is a flow chart of a design flow of an IC chip in accordance with some embodiments.

Embodiments, or examples, of the disclosure illustrated in the drawings are now described using specific languages. It will nevertheless be understood that no limitation of the scope of the disclosure is thereby intended. Any alterations and modifications in the described embodiments, and any further applications of principles described in this document are contemplated as would normally occur to one of ordinary skill in the art to which the disclosure relates. Reference numbers may be repeated throughout the embodiments, but this does not necessarily require that feature(s) of one embodiment apply to another embodiment, even if they share the same reference number.

Some embodiments have one or a combination of the following features and/or advantages. In some embodiments, when forming clusters of registers for different tapping points on a top-level clock network in a placed integrated circuit (IC) chip design, candidate registers that are in respective physical vicinity of each cluster are identified, and a register in the candidate registers that is in a register pair with a higher timing criticality and across a border of the cluster is given priority over a register in the candidate registers that is located closer to the cluster. In this manner, the identified candidate registers are physical aware and the register pair with the higher timing criticality is assigned in the same cluster coupled to the same tapping point and has a shorter non-common clock paths. Therefore, length of wires for connecting the registers to the clock tapping points are reduced and a clock skew due to on chip variations (OCVs) in the non-common clock paths is reduced. Further, in some embodiments, when a candidate register of a cluster is a register in another cluster, and if the candidate register are in register pairs across a boundary of the cluster, and across a boundary of the other cluster, an effect of alleviating timing criticality of the register pair across the boundary of the cluster and an effect of exacerbating timing criticality of the register pair across the boundary of the cluster are both considered to keep a clock skew to the more timing critical register pair smaller. Further, in some embodiments, after clusters of registers are formed, loads of the clusters are balanced by avoiding reassignment of registers in more timing critical register pairs. Therefore, clock skews to timing related register pairs across the clusters are reduced without penalty of increase in timing criticality of more timing critical register pairs.

FIG. 1 is a flow chart of a design flow 100 of an IC chip in accordance with some embodiments. The design flow 100 utilizes one or more electronic design automation (EDA) tools to carry out one or more operations in the design flow 100.

At a system design stage 102, the designer describes the IC chip in terms of larger modules that serve specific functions, respectively. Further, exploration for options include design architectures is performed to consider, for example, tradeoffs in optimizing design specifications and cost.

At a logic design stage 104, the modules for the IC chip are described at the register transfer level (RTL) using the VHDL or Verilog, and is verified for functional accuracy.

At a logic synthesis stage 106, the modules for the IC chip described in RTL is translated into a gate-level netlist. Technology mapping of the logic gates and registers to cells also happen at this stage. After logic synthesis is done, the IC chip design has gone through the front-end design process and enters into a back-end physical design process in subsequent stages.

At a design planning stage 108, the gate-level netlist is partitioned into blocks and a floorplan for the blocks is created. In some embodiments, a top-level clock network is planned based on locations of the blocks at this stage. The top-level clock network includes clock trunks rooted from a clock source such as a PLL and tapping points to which clock sinks such as registers are to be connected.

At a placement stage 110, cells such as logic gates and registers are placed at specific locations in a chip area of the IC chip design.

At a clock network topology generation stage 112, register clustering for different tapping points is performed. Embodiments of the present disclosure can be performed at this stage or other stages of the design flow 100.

At a clock network synthesis and routing stage 114, interconnection of the registers to the tapping points, and interconnection of cells are performed to produce a placed-and-routed layout of the IC chip.

At an extraction and analysis stage 116, a post-route netlist is extracted from the layout of the IC chip and timing analysis is performed on the post-route netlist. Post-route optimization can be performed to achieve timing closure.

At a physical verification and signoff stage 118, the layout of the IC chip is checked to ensure correspondence to the gate-level netlist, and to ensure clean of, for example, electrical issues and lithographic issues for manufacturing. Incremental fixing can be performed to achieve final signoff of the design before tape-out.

The design flow 100 in FIG. 1 is exemplary. Other sequence of the stages or operations, or additional stages or operations before, between or after the stages shown are within the applicable scope of the present disclosure. For example, in other embodiments, the top-level clock network is planned at the placement stage based on locations of the registers.

Figure 2:
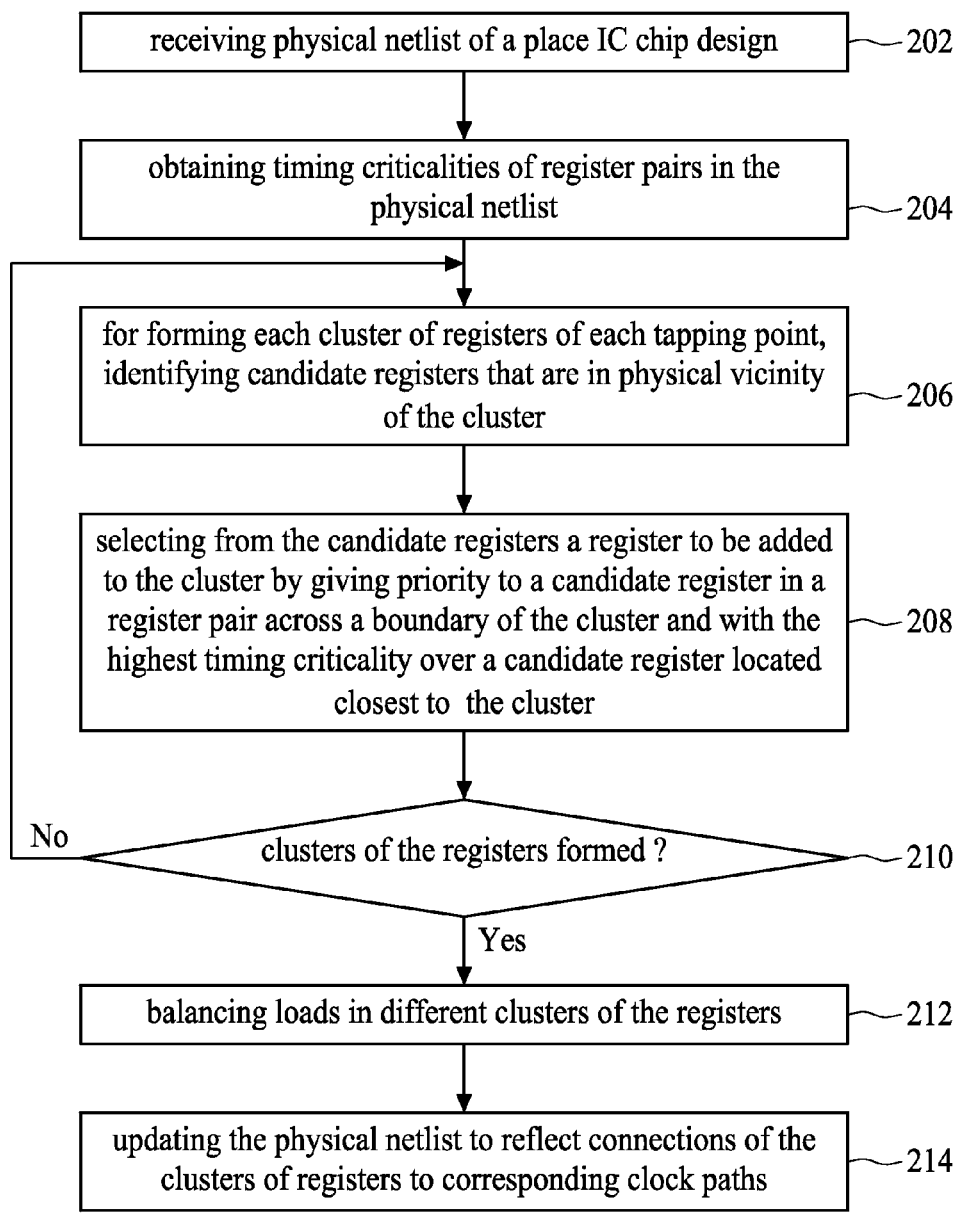
FIG. 2 is a flow chart of a physical-aware register clustering method considering timing criticalities for a generating clock network topology in accordance with some embodiments.

FIG. 2 is a flow chart of a physical-aware register clustering method considering timing criticalities for a generating clock network topology in accordance with some embodiments. The method is performed at the clock network topology generation stage 112 in FIG. 1. In operation 202, a physical netlist of a placed IC chip design is received. In operation 204, timing criticalities of register pairs in the physical netlist are obtained. In operation 206, for forming each cluster of registers of each tapping point, candidate registers that are in physical vicinity of the cluster are identified. In operation 208, a register to be added to the cluster is selected from the candidate registers by giving priority to a candidate register in a register pair across a boundary of the cluster and with the highest timing criticality over a candidate register located closest to the cluster. In operation 210, whether formation of clusters of the registers is completed is checked. If not, the method loops back to operation 206. If so, the method continues to operation 212. In operation 212, loads in different clusters of the registers are balanced. In operation 214, the physical netlist is updated to reflect connections of the clusters of the registers to corresponding clock paths.

Figure 3:
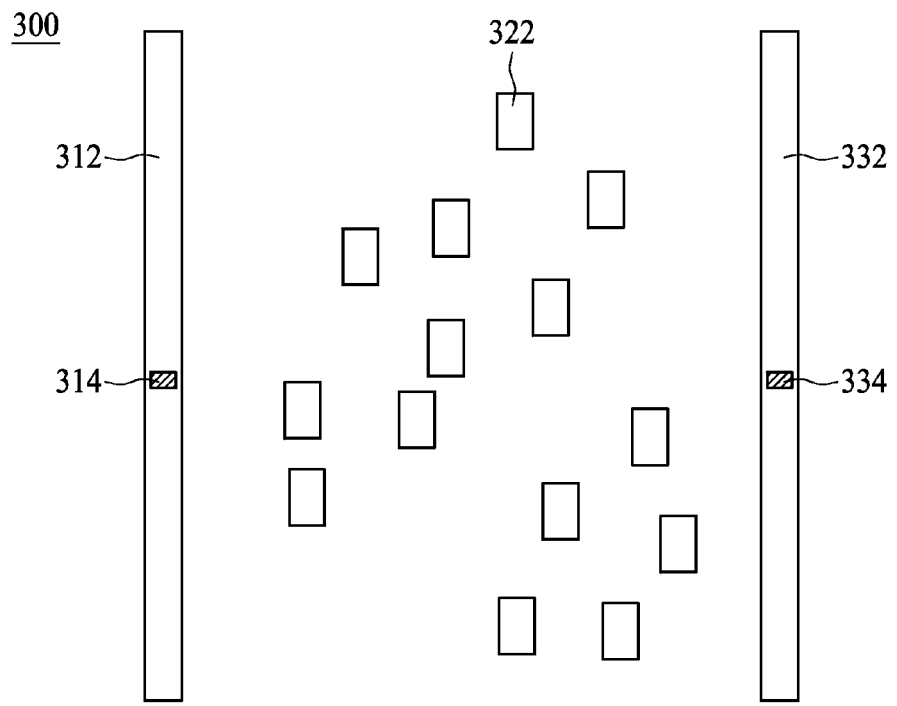
FIG. 3 is a schematic diagram of a received layout of a physical netlist of the placed IC chip design in accordance with some embodiments.

In operation 202 in FIG. 2, a physical netlist of a placed IC chip design is received. FIG. 3 is a schematic diagram of a received layout 300 of a physical netlist of the placed IC chip design in accordance with some embodiments. The term "physical netlist" used here and throughout the present disclosure refers to a physical netlist that includes a layout of a placed IC chip design and logical connections of cells in the layout of the placed IC chip design. The layout 300 of the placed IC chip design includes clock trunks 312 and 332, tapping points 314 and 334 and a plurality of registers 322. In some embodiments, the top-level clock network is planned at the design planning stage 108. The top-level clock network has, for example, a tree structure, or a hybrid tree and mesh structure. The clock trunks 312 and 332 are, for example, different branches of the tree structure that are merged at a higher level. At the clock network topology generation stage 112, routes of the clock trunks 312 and 332 and tapping points on the clock trunks have been reserved in the layout 300. Therefore, exact locations of the tapping points 314 and 334 in the layout 300 of the placed IC chip design are known. Further, cells such as the registers 322 and gates of combinational logic are placed at the placement stage 110 and the logical connections of the registers and the gates of the combinational logic are completed at the logic synthesis stage 108. For simplicity, only cells such as the registers 322 that are triggered by clock are shown. Therefore, at the clock network topology generation stage 112, exact locations of the registers 332 in the layout of the placed IC chip design and the logical connections between the registers 332 are known.

Figure 4:
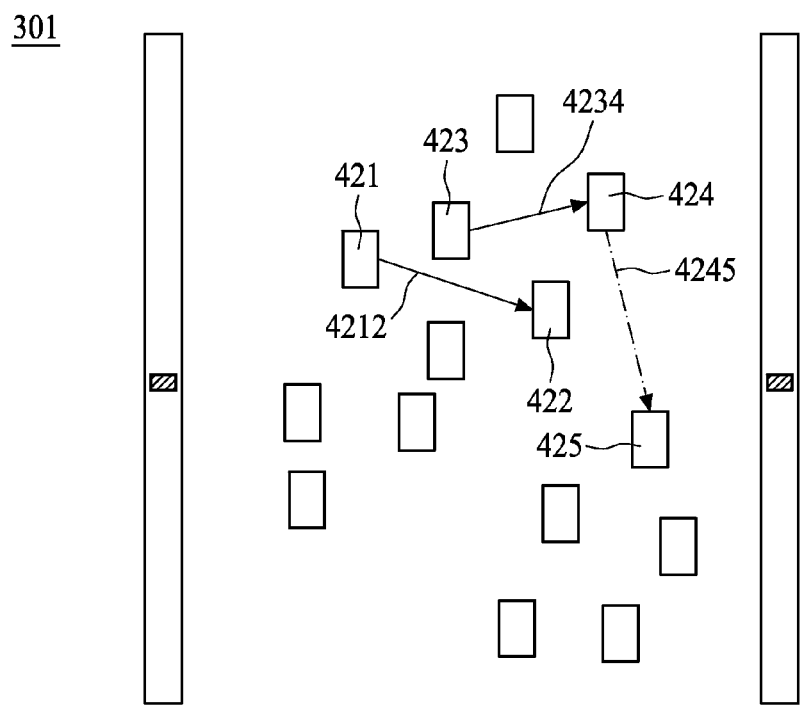
FIG. 4 is a schematic diagram of a layout of the physical netlist with identified timing related register pairs in accordance with some embodiments.

In operation 204 in FIG. 2, timing criticalities of register pairs in the registers 332 in the physical netlist are obtained. FIG. 4 is a schematic diagram of a layout 301 of the physical netlist with identified timing related register pairs in accordance with some embodiments. The identified timing related register pairs are a register pair including registers 421 and 422 related by a timing path 4212, a register pair including registers 423 and 424 related by a timing path 4234, and a register pair including registers 424 and 425 related by a timing path 4245. In the example illustrated in FIG. 4, the timing path 4234 and the timing path 4245 are associated with the register 424 and the timing path 4234 is more timing critical than the timing path 4245.

Figure 5A:
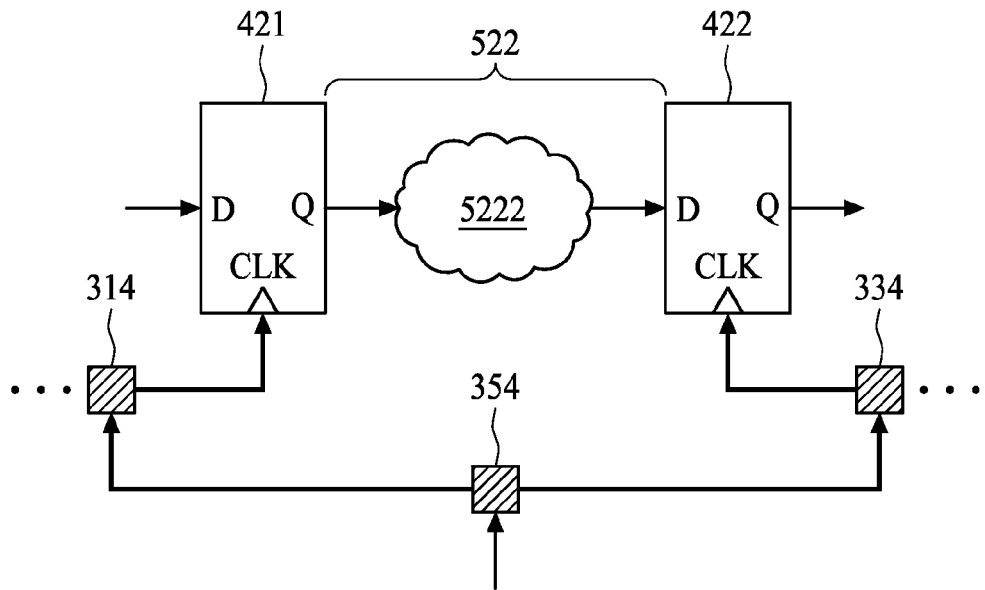
FIG. 5A is a schematic diagram illustrating a timing path of a register pair coupled to different tapping points in accordance with some embodiments.

In some embodiments, the timing criticalities of the register pairs in the registers 332 in FIG. 3 are obtained by performing timing analysis on the physical netlist. In some embodiments, a timing criticality of a register pair is a timing slack of a timing path between the register pair. FIG. 5A is a schematic diagram illustrating the timing path of the register pair 421 and 422 coupled to different tapping points 314 and 334 in accordance with some embodiments. In FIG. 5A, the register 421 is a launch register that sends input data to a data path 522 including combinational logic 5222, and the register 422 is a capture register that captures output data from the data path 522. The timing path starts from the launch register 421 sending data and ends at the capture register 422 capturing data. In some embodiments, a timing slack of a timing path is calculated based on the following equation.

$$T_{slack} = T_{period} - T_{skew}^{L-C} - T_{CQ}^{L} - T_{max\ delay}^{dp} - T_{setup}^{C} \quad (1)$$

wherein $T_{slack}$ is the timing slack of the timing path, $T_{period}$ is a clock period, $T_{skew}^{L-C}$ is a clock skew resulted from a delay of an arrival clock to the lunch register 421 with respect to an arrival clock to the capture register 422, $T_{CQ}^{L}$ is a clock to output delay of the lunch register 421, $T_{max\ delay}^{dp}$ is the maximum delay of data propagation through the data path 522, and $T_{setup}^{C}$ is a setup time of the capture register 422. In some embodiments, because at the clock network topology generation stage 112, the clock network has not been synthesized, it is assumed that the clock is an ideal clock and the clock skew $T_{skew}^{L-C}$ is equal to zero when computing the timing slack $T_{slack}$. In other embodiments, an estimate of the clock skew $T_{skew}^{L-C}$ is used when computing the timing slack $T_{slack}$. A smaller timing slack indicates a more timing critical timing path.

Figure 5B:
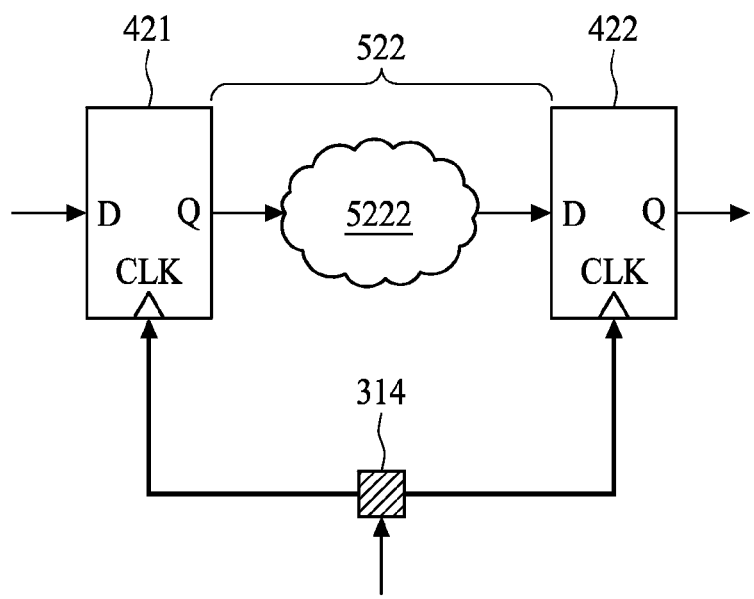
FIG. 5B is a schematic diagram illustrating a timing path of a register pair coupled to the same tapping point in accordance with some embodiments.

In addition, in FIG. 5A, clock pins CLK of the launch register 421 and the capture register 422 are coupled to different tapping points 314 and 334, respectively. FIG. 5B is a schematic diagram illustrating the timing path of the register pair 421 and 422 coupled to the same tapping point 314 in accordance with some embodiments. In FIG. 5B, the clock pins CLK of the launch register 421 and the capture register are coupled to the same tapping point 314. When the launch register 421 and the capture register 422 are coupled to different tapping points 314 and 334 as exemplarily shown in FIG. 5A, each of non-common clock paths of the registers 421 and 422 which is illustrated in bold lines is from a tapping point 354 to the tapping point 314 or 334, and from the tapping point 314 or 334 to the register 412 or 422. When the launch register 421 and the capture register 422 are coupled to the same tapping point 314 as exemplarily shown in FIG. 5B, each of non-common clock paths of the registers 421 and 422 which is illustrated in bold lines is from the tapping point 314 to the register 421 or 422. When the non-common clock paths of the registers 421 and 422 are longer, after the clock network is synthesized in the clock network synthesis and routing stage 114, OCVs cause a larger clock skew that exacerbates the timing criticality of the timing path between the register pair 421 and 422. Therefore, in order to reduce the clock skew of the timing related register pair such as the register pair 421 and 422, the timing related register pair are coupled to the same tapping point such as that shown in FIG. 5B. In the following, the registers to be coupled to the same tapping point are clustered. In some embodiments, a tapping point has one associated cluster. In other embodiments, a tapping point has multiple associated clusters.

In some embodiments, for forming clusters of the registers, after the timing slacks of the timing paths of the register pairs are obtained, weights are assigned to the timing paths of the register pairs based on the timing slacks of the timing paths. For example, in FIG. 4, a weight is assigned to the timing path 4212 of the register pair 421 and 423 based on the timing slack of the timing path 4212. In some embodiments, the smaller the timing slack of the timing path, the higher the weight is assigned to the timing path.

Figure 6:
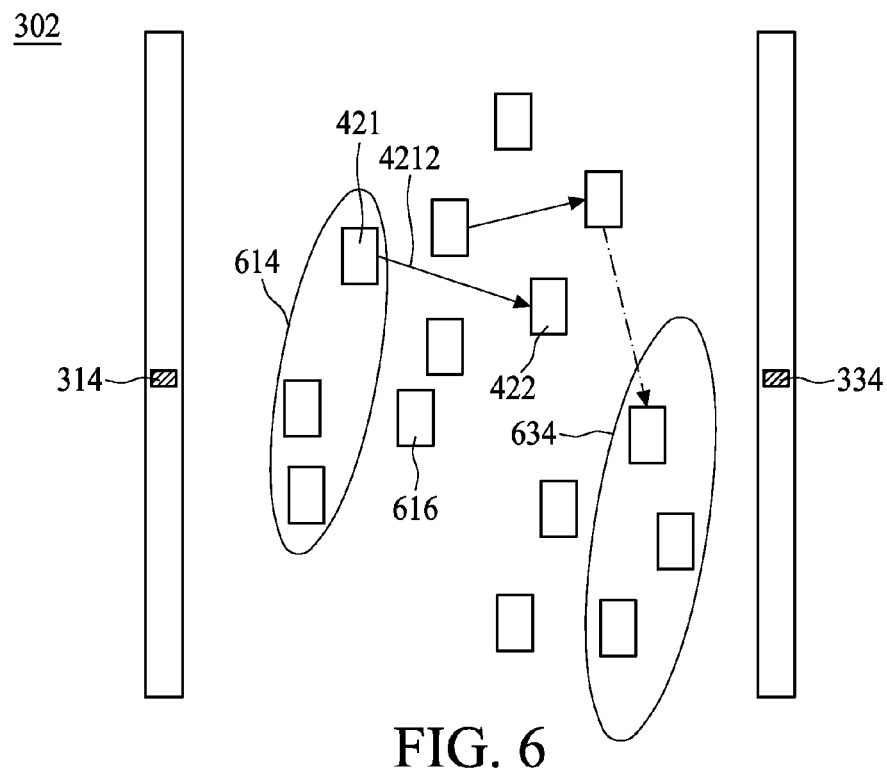
FIG. 6 is a schematic diagram of a layout of the physical netlist in one iteration for forming the clusters of the registers in accordance with some embodiments.

Operations 206 to 210 in FIG. 2 form an iterative loop for forming clusters of the registers in the physical netlist. In operation 206, for forming each cluster of registers of each tapping point, candidate registers that are in physical vicinity of the cluster are identified. In operation 208, a register to be added to the cluster is selected from the candidate registers by giving priority to a candidate register in a register pair across a boundary of the cluster and with the highest timing criticality over a candidate register located closest to the cluster. In operation 210, whether formation of clusters of the registers is completed is checked. If not, the method loops back to operation 206. FIG. 6 is a schematic diagram of a layout 302 of the physical netlist in one iteration for forming the clusters of the registers in accordance with some embodiments. Before this iteration, a cluster 614 of the tapping point 314 and a cluster 634 of the tapping point 334 are formed. The registers in the cluster 614 and the registers in the cluster 634 are selected because of, for example, being physically closer to the tapping points 314 and 334, respectively. In this iteration, for the cluster 614, candidate registers such as the register 422 and a register 616 within physical vicinity of the cluster 614 are identified. In some embodiments, the physical vicinity of the cluster 614 is a region outside the cluster 614 which is within a certain distance from one of the register in the cluster 614, such as the register close to a border of the cluster 614 if a density-based clustering algorithm is used, or is within a certain distance from a representative point obtained with respect to some of the registers in the cluster 614, such as a centroid of the cluster 614 if a centroid-based clustering algorithm is used. A physical vicinity of a cluster is determined by an algorithm used to grow the cluster. Other ways to define the physical vicinity of the cluster are within the contemplated scope of the present disclosure.

In the candidate registers that are identified for the cluster 614, the register 422 is in the register pair 421 and 422 related by the timing path 4212, and the register 421 of the register pair 421 and 422 is in the cluster 614. In addition, in the candidate registers that are identified for the cluster 614, the register 616, for example, is located physically closest to one of the registers in the cluster 614 or a representative point of some registers in the cluster 614. When selecting a register to be added into the cluster 614 from the candidate registers, sum of weights of other candidate registers in register pairs across a boundary of the cluster 614 is minimized. For example, when evaluating selecting the register 616 as the register to be added to the cluster 614, sum of weights of other candidate registers in register pairs across the boundary of the cluster 614 is equaled to the weight of the timing path 4212 of the register pair 421 and 422. The weight of the timing path 4212 determined based on the timing slack of the timing path 4212 is high. When evaluating selecting the register 422 as the register to be added to the cluster 614, sum of weights of other candidate registers in the register pair across the boundary of the cluster 614 is equaled to zero because the register 422 is now considered within the cluster 614. Therefore, because the sum of weights of selecting the register 422 is smaller than the sum of weights of selecting the register 616, priority is given to the register 422 in the register pair 421 and 422 across the boundary of the cluster 614 and with the highest timing criticality over the register 616 which is located closest to the cluster 614.

In other embodiments, each candidate register is assigned a weight in an iteration. The weight of the candidate register is determined based on both if the candidate register is in a timing related register pair across a boundary of a cluster, a timing slack of the timing path of the register pair, and a distance between the candidate register and one of the registers in the cluster or a representative point of some registers in the clusters. Selecting a register to be added to the cluster involves finding a register in the candidate registers such that sum of weights of other candidate registers is minimized.

Figure 7:
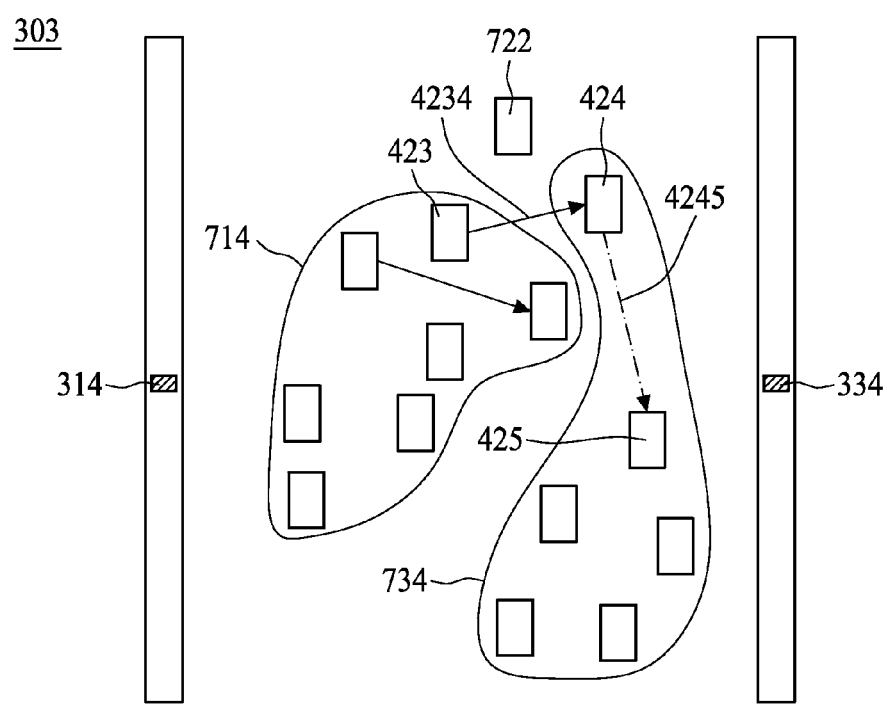
FIG. 7 is a schematic diagram of a layout of the physical netlist in another iteration for forming the clusters of the registers in accordance with some embodiments.

FIG. 7 is a schematic diagram of a layout 303 of the physical netlist in another iteration for forming the clusters of the registers in accordance with some embodiments. Before this iteration, a cluster 714 of the tapping point 314 and a cluster 734 of the tapping point 334 are formed. In this iteration, for the cluster 714, candidate registers such as the register 722 and the register 424 within physical vicinity of the cluster 714 are identified. The register 424 is selected into the cluster 734 before this iteration. The register 424 is in the register pair 423 and 424 related by the timing path 4234 across a boundary of the cluster 714. Further, the register is also in the register pair 424 and 425 related by the timing path 4245 within the cluster 734. The timing path 4234 is more timing critical than the timing path 4245 and is therefore assigned a higher weight. When the register 722 is being evaluated to be selected to be added to the cluster 714, sum of weights of other candidate registers in register pairs across the boundary of the cluster 714 is equaled to the weight of the timing path 4234 of the register pair 4212. When the register 424 is being evaluated to be selected to be added to the cluster 714, increase in sum of weights of the cluster 734 due to the reassignment of the register 424 is also considered. Sum of weights for reassigning the register 424 to the cluster 734 is equaled to sum of weights of other candidate registers in register pairs across the boundary of the cluster 714 which is zero plus the increase in sum of weights of the cluster due to the reassignment of the register 424 which is the weight of the timing path 4245. Compared to the selection of the register 722, the sum of weights for the selection of the register 424 is smaller. Therefore, the register 424 is given priority to be selected to be added to the cluster 714 over the register 722.

Figure 8:
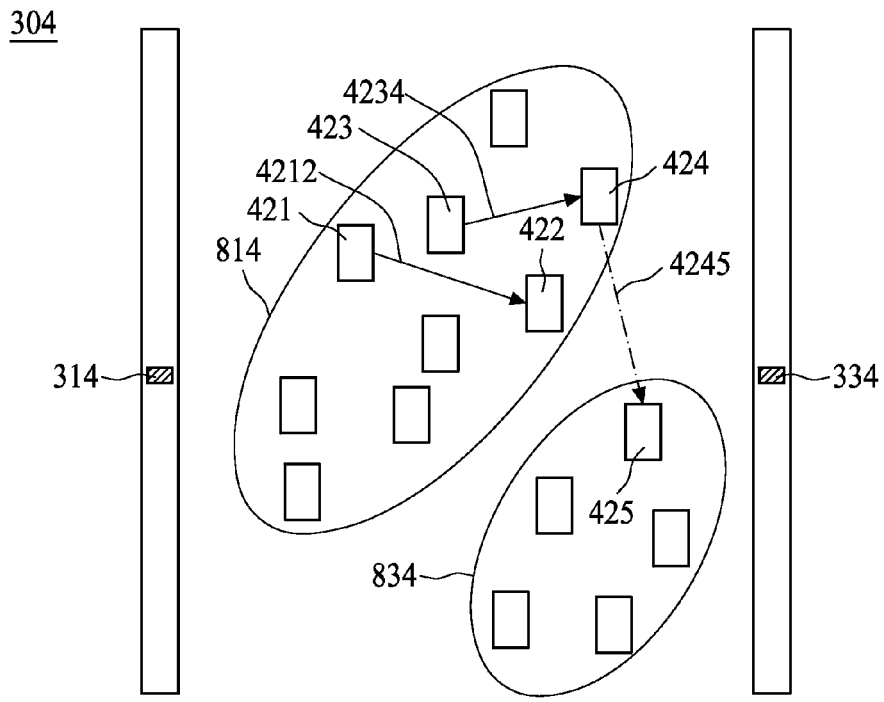
FIG. 8 is a schematic diagram of a layout of the physical netlist with formed clusters of the registers in accordance with some embodiments.

FIG. 8 is a schematic diagram of a layout 304 of the physical netlist with formed clusters of the registers in accordance with some embodiments. In some embodiments, the iterative formation of clusters of the registers completes when sum of weights of register pairs across a cluster 814 and a cluster 834 does not reduce over iterations. In other embodiments, iterative formation of clusters of the registers completes when a predetermined number of iterations is reached. In FIG. 8, the register 425 in the register pair 424 and 425 with the timing path 4245 across the cluster 814 and the cluster 834 is in the cluster 834 due to, for example, other timing paths of the register 425 within the cluster 834 which are not shown for simplicity, or in the embodiments where a weight includes also a distance factor, a location of the register 425 being very close to the tapping point 334. In the formed clusters 814 and 834 of the registers, the register pair 421 and 422 related by the timing path 4212, and the register pair 423 and 424 related by the timing path 4234 are within the same cluster 814. Therefore, both the registers 421 and 422 of the timing path 4212 will be coupled to the same tapping point 314, and both the registers 423 and 424 of the timing path 4234 will be coupled to the same tapping point 314. Non-common clock paths between the registers 421 and 422 are minimized and non-common clock paths between the registers 423 and 424 are minimized, and therefore clock skews due to OCVs in the non-common clock paths are minimized.

Figure 9:
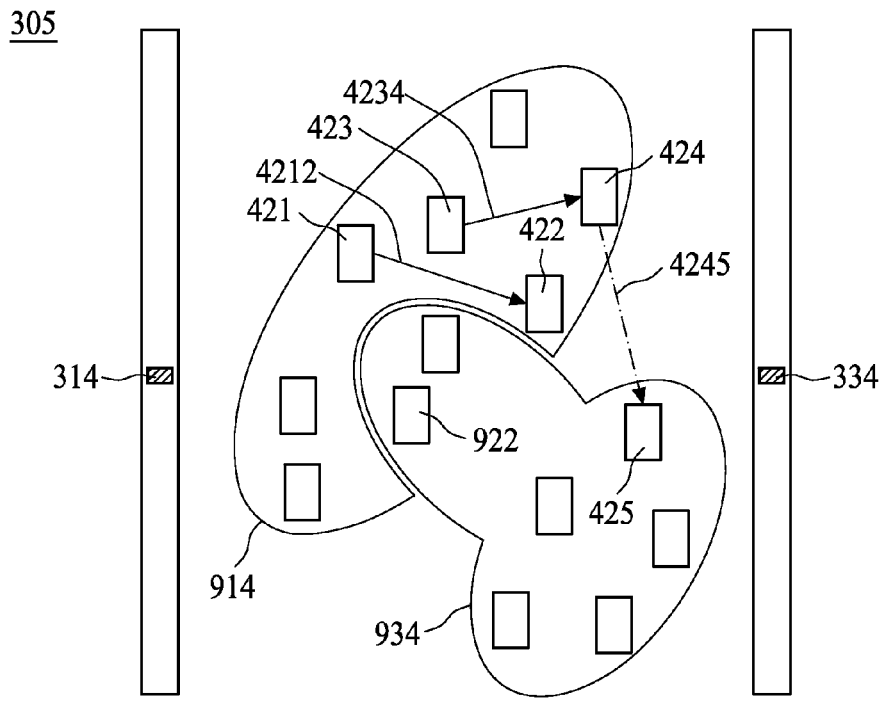
FIG. 9 is a schematic diagram of a layout of the physical netlist after load balancing is performed in accordance with some embodiments.

In some embodiments, the clusters 814 and 834 are used for updating physical netlist for clock network synthesis. In other embodiments, a further operation, the operation 212 is introduced after the iterative formation of the clusters completes. In operation 212, loads in different clusters of the registers are balanced. FIG. 9 is a schematic diagram of a layout 305 of the physical netlist after load balancing is performed in accordance with some embodiments. In some embodiments, for load balancing, interfacing registers in a cluster with a higher load that interface a cluster with a lower load is identified. Then a register in the interfacing registers is selected to be reassigned to the cluster with the lower load if the register induces the smallest increase in sum of weights of register pairs across the cluster with the higher load and the cluster with the lower load. For example, in FIG. 8, the cluster 814 has a load of nine registers and the cluster 834 has a load of five registers. For balancing loads of the clusters 814 and 834, interfacing registers such as a register 922 indicated in FIG. 9 and the register 422 that are in the cluster 814 and interface with the cluster 834 are identified. If the register 422 is reassigned to the cluster 834, an increase in sum of weights of register pairs across the cluster 814 and the cluster 834 is equal to the weight of the timing path 4212. On the other hand, if the register 922 is reassigned to the cluster 834, an increase in sum of weights of register pairs across the cluster 814 and 834 is equal to zero. Therefore, as shown in FIG. 9, the register 422 stays in a cluster 914 of the tapping point 314 and the register 922 is reassigned to a cluster 934 of the tapping point 334. Load balancing is performed until loads of the formed clusters 914 and 934 cannot be further balanced. In the example in FIG. 9, each of the clusters 914 and 934 after load balancing has a load of seven registers. With balanced loads, a higher delay of a clock propagating from the tapping point 314 to the cluster 814 due to the higher load is reduced, while a lower delay of the clock propagating from the tapping point 334 to the cluster 834 due to the lower load is increased. Therefore, clock skews with respect to register pairs such as the register pair 424 and 425 across the clusters 914 and 934 are reduced.

Figure 10:
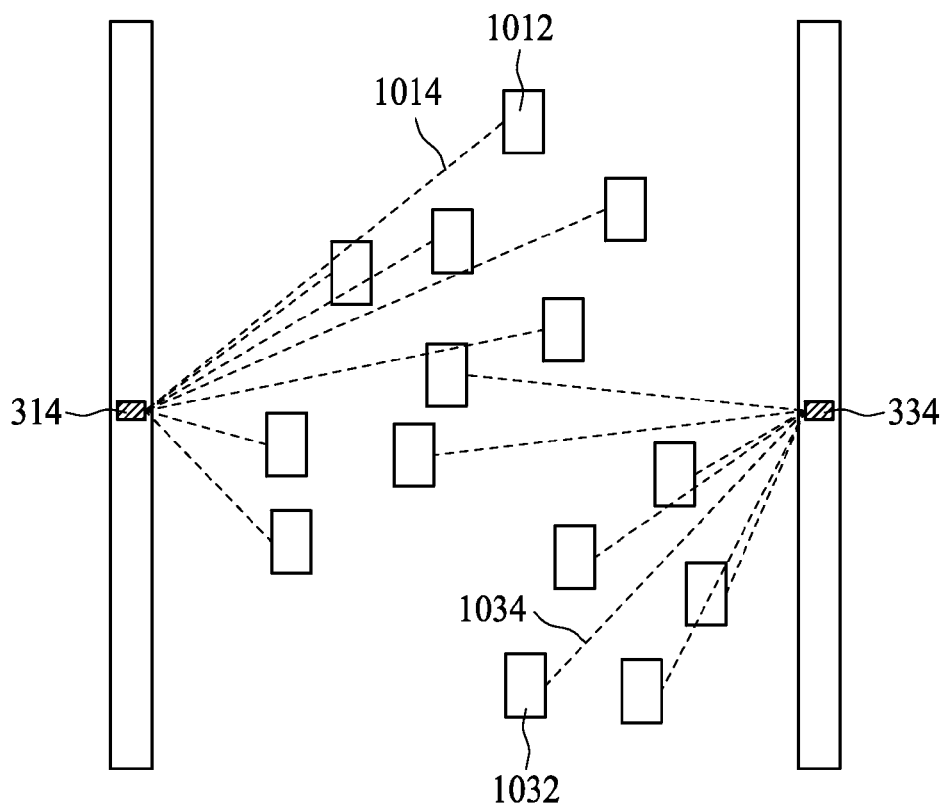
FIG. 10 is a schematic diagram of a layout of the physical netlist with updated connections to tapping points based on clusters of the registers in accordance with some embodiments.

In operation 214 in FIG. 2, the physical netlist is updated to reflect connections of the clusters of the registers to corresponding clock paths. FIG. 10 is a schematic diagram of a layout 306 of the physical netlist with updated connections to the tapping points based on the clusters of the registers in accordance with some embodiments. Based on the clusters 914 and 934 formed after load balancing in FIG. 9, connections 1014 of the registers 1012 in the cluster 914 to the tapping point 314, and connections 1034 of the registers 1032 in the cluster 934 to the tapping point 334 are updated in the physical netlist. Based on these updated connections 1014 and 1034, at clock network synthesis and routing stage 114, routes between the registers 1012 and the tapping point 314 and between the registers 1032 and the tapping points 334 will be formed.

Figure 11:
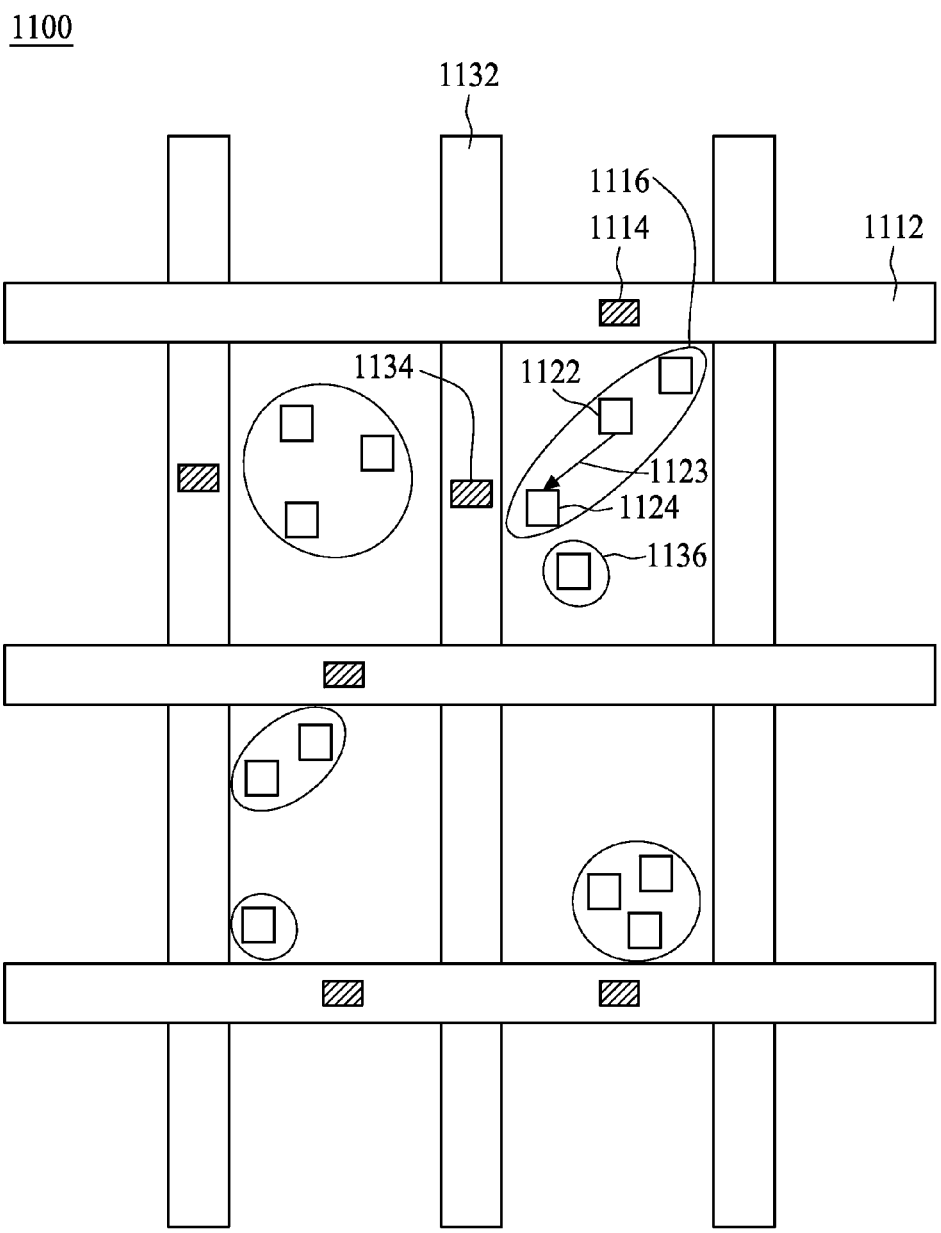
FIG. 11 is a schematic diagram of a layout of a physical netlist with formed clusters of the registers in accordance with other embodiments.

FIG. 11 is a schematic diagram of a layout 1100 of a physical netlist with formed clusters of the registers in accordance with other embodiments. Compared to embodiments illustratively shown in FIG. 8, a top-level clock network of the embodiments illustratively shown in FIG. 11 includes a clock mesh composed by horizontal clock trunks such as a horizontal clock trunk 1112 and vertical clock trunks such as a vertical clock trunk 1132 crossing the horizontal clock trunks. The method embodiments described with reference to FIG. 2 are applicable to the top-level clock network including the clock mesh. For example, a tapping point 1114 is located on the horizontal clock trunk 1112, and a tapping point 1134 is located on the vertical clock trunk 1114 crossing the horizontal clock trunk 1112. A cluster 1116 of the tapping point 1114 and a cluster of 1136 of the tapping point 1134 are formed by performing the flow in FIG. 2. Therefore, a register 1124 which is located closer to the tapping point 1134 is not assigned into the cluster 1136 because the register 1124 is in a register pair 1122 and 1124 which is related by a timing critical timing path 1123, and the other register 1122 in the register pair 1122 and 1124 is assigned into the cluster 1116. In this manner, non-common clock paths between the registers 1122 and 1124 are minimized, and therefore clock skews due to OCVs are minimized.

Figure 12:
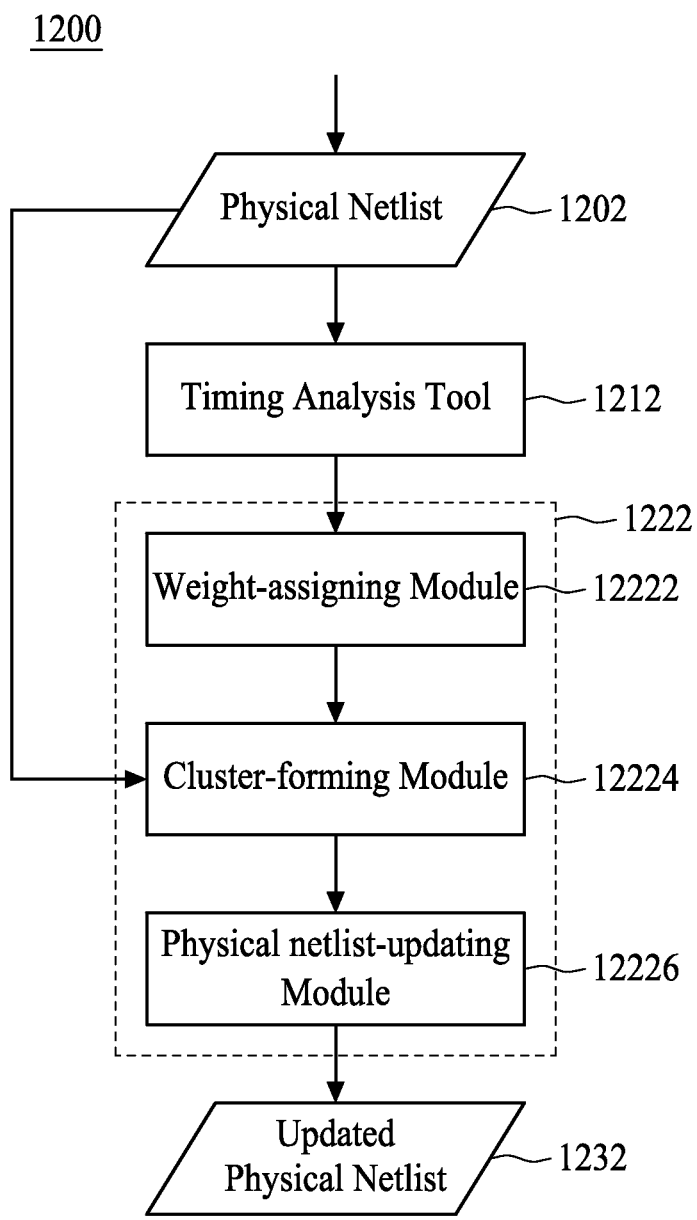
FIG. 12 is a block diagram of a software system that implements the clock network topology generation stage in FIG. 1 in accordance with some embodiments.

FIG. 12 is a block diagram of a software system 1200 that implements the clock network topology generation stage 112 in FIG. 1 in accordance with some embodiments. The software system 1200 includes a timing analysis tool 1212, and a place-and-route tool 1222. The timing analysis tool 1212 receives a physical netlist 1202 generated by, for example, a placement module (not shown) in the place- and route 1222 tool. The timing analysis tool 1212 is configured to obtain timing criticalities of register pairs in the physical netlist 1202. Embodiments described with reference to the operations 202 and 204 in FIG. 2 are applicable in the timing analysis tool 1212. The place- and route tool 1222 includes a weight-assigning module 12222, a cluster-forming module 12224 and a physical netlist-updating module 12226. The weight-assigning module 12222 is configured to receive the timing criticalities of the register pairs in physical netlist 1202 and assign weights to the register pairs based on the timing criticalities of the register pairs. Embodiments related to weight assigning discussed above are applicable to the weight-assigning module 12222. The cluster-forming module 12224 is configured to receive the physical netlist 1202 and the weights of the register pairs in the physical netlist 1202, and form clusters of the registers by performing operations 206 to 212 in FIG. 2. Embodiments described with reference to the operations 206 to 212 in FIG. 2 are applicable to the clustering-forming module 12224. The physical-netlist updating module 12226 is configured to receive the formed clusters of the registers in the physical netlist 1202 and generate an updated physical netlist 1232 based on the formed clusters. Embodiments described with reference to the operation 214 in FIG. 2 are applicable to the physical netlist-updating module 12226.

Figure 13:
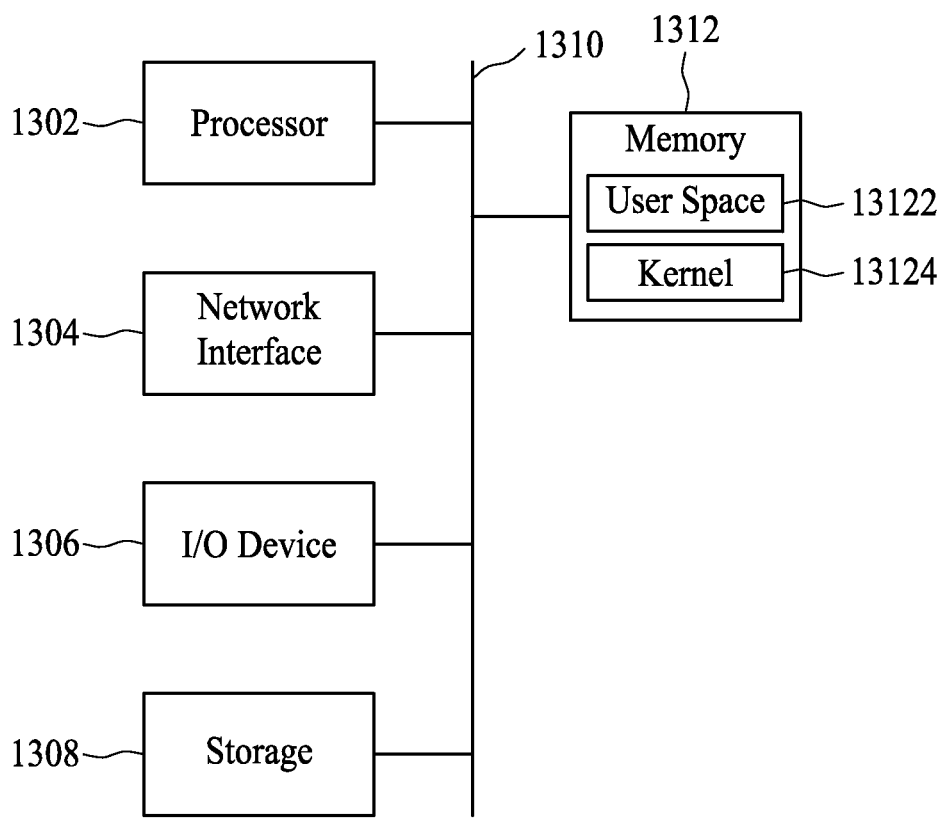
FIG. 13 is a block diagram of a hardware system for implementing method embodiments described with reference to FIGS. 2-11 and software system embodiments described with reference to FIG. 12 in accordance with some embodiments.

FIG. 13 is a block diagram of a hardware system 1300 for implementing method embodiments described with reference to FIGS. 2-11 and software system embodiments described with reference to FIG. 12 in accordance with some embodiments. The system 1300 includes at least one processor 1302, a network interface 1304, an input and output (I/O) device 1306, a storage 1308, a memory 1312, and a bus 1310. The bus 1310 couples the network interface 1304, the I/O device 1306, the storage 1308 and the memory 1312 to the processor 1302.

In some embodiments, the memory 1312 comprises a random access memory (RAM) and/or other volatile storage device and/or read only memory (ROM) and/or other non-volatile storage device. The memory 1312 includes a kernel 13124 and user space 13122, configured to store program instructions to be executed by the processor 1302 and data accessed by the program instructions.

In some embodiments, the network interface 1304 is configured to access program instructions and data accessed by the program instructions stored remotely through a network. The I/O device 1306 includes an input device and an output device configured for enabling user interaction with the system 1300. The input device comprises, for example, a keyboard, a mouse, etc. The output device comprises, for example, a display, a printer, etc. The storage device 1308 is configured for storing program instructions and data accessed by the program instructions. The storage device 1308 comprises, for example, a magnetic disk and an optical disk.

In some embodiments, when executing the program instructions, the processor 130 is configured to perform method embodiments described with reference to FIGS. 2-11, or is configured as the software system 1200 described with reference to FIG. 12.

In some embodiments, the program instructions are stored in a non-transitory computer readable recording medium such as one or more optical disks, hard disks and non-volatile memory devices.

In some embodiments, in a method performed by at least one processor, a physical netlist of a placed integrated circuit (IC) chip design is received by the at least one processor. The physical netlist comprises a plurality of registers. Timing criticalities of register pairs in the registers are obtained by the at least one processor. Clusters of the registers are formed by the at least one processor. When forming cluster of the registers, candidate registers that are in physical vicinity of a first cluster are identified, and a first register is selected to be added to the first cluster by giving priority to a candidate register in a register pair across a boundary of the first cluster and with a higher timing criticality over a candidate register located closer to the first cluster. The registers in the same cluster have shorter non-common clock paths than the registers in different clusters.

In some embodiments, a system comprises at least one processor and at least one memory. The at least one processor is configured to execute program instructions which configure the at least one processor as a timing analysis tool and a cluster-forming module. The timing analysis tool is configured to receive a physical netlist of a placed integrated circuit (IC) chip design comprising a plurality of registers and obtain timing criticalities of register pairs in the registers. The cluster-forming module is configured to receive the physical netlist and the timing criticalities of the register pairs and form clusters of the registers by performing operations comprising: identifying candidate registers that are in physical vicinity of a first cluster and selecting from the candidate registers a first register to be added to the first cluster by giving priority to a candidate register in a register pair across a boundary of the first cluster and with a higher timing criticality over a candidate register located closer to the first cluster. The registers in the same cluster have shorter non-common clock paths than the registers in different clusters. The at least one memory is configured to store the program instructions.

In some embodiments, a non-transitory computer-readable storage medium storing program instructions that when executed by a computer cause the computer to perform a method. In the method, a physical netlist of a placed integrated circuit (IC) chip design is received by the at least one processor. The physical netlist comprises a plurality of registers. Timing criticalities of register pairs in the registers are obtained by the at least one processor. Clusters of the registers are formed by the at least one processor. When forming cluster of the registers, candidate registers that are in physical vicinity of a first cluster are identified, and a first register is selected to be added to the first cluster by giving priority to a candidate register in a register pair across a boundary of the first cluster and with a higher timing criticality over a candidate register located closer to the first cluster. The registers in the same cluster have shorter non-common clock paths than the registers in different clusters.

The above description includes exemplary operations, but these operations are not necessarily required to be performed in the order shown. Operations may be added, replaced, changed order, and/or eliminated as appropriate, in accordance with the spirit and scope of the disclosure. Accordingly, the scope of the disclosure should be determined with reference to the following claims, along with the full scope of equivalences to which such claims are entitled.

What is claimed is:

1. A method performed by at least one processor, comprising:
  receiving, by the at least one processor, a physical netlist of a placed integrated circuit (IC) chip design, the physical netlist comprising a plurality of registers;
  obtaining, by the at least one processor, timing criticalities of register pairs in the registers;
  assigning weights to the register pairs based on the timing criticalities of the register pairs; and
  forming, by the at least one processor, clusters of the registers comprising:
    identifying candidate registers that are in physical vicinity of a first cluster; and
    selecting from the candidate registers a first register to be added to the first cluster by giving priority to a candidate register in a register pair across a boundary of the first cluster and with a higher timing criticality over a candidate register located closer to the first cluster, the registers in the same cluster having shorter non-common clock paths than the registers in different clusters, and the selecting comprising:
      if a first candidate register in the candidate registers of the first cluster is unclustered, selecting the first candidate register as the first register to be added to the first cluster if sum of weights of other candidate registers in register pairs across the boundary of the first cluster is optimized.

2. The method according to claim 1, wherein the selecting further comprises:
if a first candidate register in the candidate registers of the first cluster is in a second cluster, selecting the first candidate register as the first register to be added to the first cluster if sum of weights of other candidate registers in register pairs across the boundary of the first cluster and the first candidate register in one or more register pairs across a boundary of the second cluster is optimized.

3. The method according to claim 1, wherein obtaining, by the at least one processor, timing criticalities of register pairs in the registers comprises:
performing timing analysis on the physical netlist to obtain the timing slacks of the register pairs in the registers.

4. The method according to claim 1, further comprising:
balancing loads in different clusters of the registers comprising:
identifying interfacing registers in a cluster with a higher load that interface with a cluster with a lower load; and
selecting a register in the interfacing registers to be reassigned to the cluster with the lower load that induces a smaller increase in sum of weights of register pairs across the cluster with the higher load and the cluster with the lower load than another register in the interfacing registers.

5. The method according to claim 1, further comprising:
updating the physical netlist to reflect connections of the clusters of registers to the corresponding clock paths.

6. A system, comprising:
at least one processor, configured to execute program instructions which configure the at least one processor as:
a timing analysis tool, configured to receive a physical netlist of a placed integrated circuit (IC) chip design comprising a plurality of registers and obtain timing criticalities of register pairs in the registers;
a weight-assigning module configured to assign weights to the register pairs based on the timing criticalities of the register pairs; and
a cluster-forming module, configured to receive the physical netlist and the timing criticalities of the register pairs and form clusters of the registers by performing operations comprising:
identifying candidate registers that are in physical vicinity of a first cluster; and
selecting from the candidate registers a first register to be added to the first cluster by giving priority to a candidate register in a register pair across a boundary of the first cluster and with a higher timing criticality over a candidate register located closer to the first cluster, the registers in the same cluster having shorter non-common clock paths than the registers in different clusters, and the selecting comprising:
if a first candidate register in the candidate registers of the first cluster is unclustered, selecting the first candidate register as the first register to be added to the first cluster if sum of weights of other candidate registers in register pairs across the boundary of the first cluster is optimized; and
at least one memory configured to store the program instructions.

7. The system according to claim 6, wherein the selecting of the cluster-forming module further comprises:
if a first candidate register in the candidate registers of the first cluster is in a second cluster, selecting the first candidate register as the first register to be added to the first cluster if sum of weights of other candidate registers in register pairs across the boundary of the first cluster and the first candidate register in one or more register pairs across a boundary of the second cluster is optimized.

8. The system according to claim 6, wherein the timing analysis tool obtains the timing criticalities of the register pairs in the registers by:
performing timing analysis on the physical netlist to obtain the timing slacks of the register pairs in the registers.

9. The system according to claim 6, further comprising:
the cluster-forming module further configured to balance loads in different clusters of the registers by performing operations comprising:
identifying interfacing registers in a cluster with a higher load that interface with a cluster with a lower load; and
selecting a register in the interfacing registers to be reassigned to the cluster with the lower load that induces a smaller increase in sum of weights of register pairs across the cluster with the higher load and the cluster with the lower load than another register in the interfacing registers.

10. The system according to claim 6, further comprising:
a physical netlist-updating module, configured to update the physical netlist to reflect connections of the clusters of registers to the corresponding clock paths.

11. A non-transitory computer-readable storage medium storing program instructions that when executed by a computer cause the computer to perform a method, the method comprising:
receiving, by the at least one processor, a physical netlist of a placed integrated circuit (IC) chip design, the physical netlist comprising a plurality of registers;
obtaining, by the at least one processor, timing criticalities of register pairs in the registers;
assigning weights to the register pairs based on the timing criticalities of the register pairs; and
forming, by the at least one processor, clusters of the registers comprising:
identifying candidate registers that are in physical vicinity of a first cluster; and
selecting from the candidate registers a first register to be added to the first cluster by giving priority to a candidate register in a register pair across a boundary of the first cluster and with a higher timing criticality over a candidate register located closer to the first cluster, the registers in the same cluster having shorter non-common clock paths than the registers in different clusters, and the selecting comprising:
if a first candidate register in the candidate registers of the first cluster is unclustered, selecting the first candidate register as the first register to be added to the first cluster if sum of weights of other candidate registers in register pairs across the boundary of the first cluster is optimized.

12. The computer-readable storage medium according to claim 11, wherein the selecting further comprises:
if a first candidate register in the candidate registers of the first cluster is in a second cluster, selecting the first candidate register as the first register to be added to the first cluster if sum of weights of other candidate registers in register pairs across the boundary of the first cluster and the first candidate register in one or more register pairs across a boundary of the second cluster is optimized.

13. The computer-readable storage medium according to claim 11, obtaining, by the at least one processor, timing criticalities of register pairs in the registers comprises:
    performing timing analysis on the physical netlist to obtain the timing slacks of the register pairs in the registers.

14. The computer-readable storage medium according to claim 11, further comprising
    balancing loads in different clusters of the registers comprising:
        identifying interfacing registers in a cluster with a higher load that interface with a cluster with a lower load; and
        selecting a register in the interfacing registers to be reassigned to the cluster with the lower load that induces a smaller increase in sum of weights of register pairs across the cluster with the higher load and the cluster with the lower load than another register in the interfacing registers.

* * * * *